United States Patent
Kuster (10) Patent No.: US 9,273,767 B2
(45) Date of Patent: Mar. 1, 2016

(54) SHAFT HAVING A JOURNAL (75) Inventor: Hanspeter Kuster, Balgach (CH)

(73) Assignee: SFS INTEC HOLDING AG, Heerbrugg (CH)

( * ) Notice: Subject to any disclaimer, the term of this patent is extended or adjusted under 35 U.S.C. 154(b) by 0 days.

(21) Appl. No.: 14/122,735

(22) PCT Filed: May 25, 2012

(86) PCT No.: PCT/EP2012/059828
§ 371 (c)(1),
(2), (4) Date: Nov. 27, 2013

(87) PCT Pub. No.: WO2012/163825
PCT Pub. Date: Dec. 6, 2012

(65) Prior Publication Data
US 2014/0090501 A1    Apr. 3, 2014

(30) Foreign Application Priority Data
Jun. 1, 2011    (DE) .................. 10 2011 050 814

(51) Int. Cl.
| F16H 25/02 | (2006.01) |
| F16H 25/24 | (2006.01) |
| F16D 1/12 | (2006.01) |
| F16D 3/04 | (2006.01) |
(Continued)

(52) U.S. Cl.
CPC *F16H 25/20* (2013.01); *F16D 1/10* (2013.01); *F16D 1/116* (2013.01); *F16D 3/02* (2013.01); *F16D 3/04* (2013.01); *F16H 25/24* (2013.01); *F16D 2125/40* (2013.01); *F16H 2025/2445* (2013.01); *Y10T 74/19721* (2015.01)

(58) Field of Classification Search
CPC ..... F16H 25/22; F16H 25/20; F16H 25/2204; F16H 2025/2445; B23Q 5/408; F16D 65/18; F16D 2121/14; F16D 2121/24; F16D 2125/40
USPC ......... 74/89.23, 89.36, 89.42; 188/72.7, 72.8; 192/84.6, 94; 411/389
See application file for complete search history.

(56) References Cited

U.S. PATENT DOCUMENTS 808,273 A  * 12/1905  Darlington ................... 192/141
4,278,152 A  *  7/1981  Tosi ............................. 188/71.9
(Continued)

FOREIGN PATENT DOCUMENTS

DE          10150803       5/2003
DE        102009036886     2/2011
(Continued)

*Primary Examiner* — William Kelleher
*Assistant Examiner* — Bobby Rushing, Jr.
(74) *Attorney, Agent, or Firm* — Volpe and Koenic, P.C.

(57) ABSTRACT

A threaded spindle (11), having a drive part (20), which has a longitudinal axis (A) and is mounted in a first journal (70), and having a threaded part (30), which has a longitudinal axis (B), and having a threaded nut (50), which is mounted in a second journal (80a; 80b) and in which the threaded part (30) is guided. The drive part (20) and the threaded part (30) are formed as separate parts and are each provided with at least one coupling element (25, 55), which are connected to each other in an articulated manner by plugging together. An offset of the longitudinal axes (A, B) can be compensated in this manner. The two-part threaded spindle (11) forms a threaded drive with the threaded nut (50) thereof, which can for example be used in a parking brake of a vehicle braking system.

14 Claims, 5 Drawing Sheets (51) Int. Cl.

| | | |
|---|---|---|
| *F16D 3/10* | (2006.01) | |
| *F16H 25/20* | (2006.01) | |
| *F16D 1/10* | (2006.01) | |
| *F16D 1/116* | (2006.01) | |
| *F16D 3/02* | (2006.01) | |
| *F16D 125/40* | (2012.01) | |

(56) References Cited

U.S. PATENT DOCUMENTS

| | | | | |
|---|---|---|---|---|
| 4,373,404 A | * | 2/1983 | Heinz | 74/89.25 |
| 4,836,338 A | * | 6/1989 | Taig | 188/72.1 |
| 5,711,709 A | * | 1/1998 | McCoy | 464/106 |
| 6,405,836 B1 | * | 6/2002 | Rieth et al. | 188/72.1 |
| 2004/0262097 A1 | * | 12/2004 | Gerard et al. | 188/72.8 |
| 2007/0029142 A1 | * | 2/2007 | Drennen et al. | 188/72.7 |
| 2009/0054165 A1 | * | 2/2009 | Kobayashi | 464/145 |
| 2012/0079902 A1 | | 4/2012 | Osterlanger et al. | |
| 2012/0090418 A1 | | 4/2012 | Barthlein et al. | |

FOREIGN PATENT DOCUMENTS

| | | |
|---|---|---|
| DE | 102010063300 | 6/2011 |
| WO | 9945292 | 9/1999 |
| WO | 2011018304 | 2/2011 |

\* cited by examiner

SHAFT HAVING A JOURNAL

BACKGROUND

The invention relates to a threaded spindle with a drive part, which has a longitudinal axis and is mounted by a first journal, and having a threaded part, which likewise has a longitudinal axis, and having a threaded nut, which is mounted to a second journal and in which the threaded part is guided.

Such a threaded spindle with a threaded nut is commonly embodied in prior art as a ball screw, which may be used in the field of flap and door opening systems and primarily in the field of vehicles. In vehicles it can be used, for example in the vehicle brakes. Here, the drive part is set in motion with the help of an electric motor. This results in a longitudinal motion of the threaded nut being generated, which operates a brake piston and this way acts as the locking device for a vehicle brake. The threaded part contacts via balls the threaded nut. In the spindle/ball journal arrangement known from the document DE 101 50 803 A1, thus in a ball screw drive, a jamming may occur of the threaded nut and the threaded spindle when the threaded nut is moved back. In order to prevent this it is known from the document WO 99/45292 A1 to provide the threaded nut with a projection at its face adjacent to the drive part, which can be made to contact a stop embodied at the drive part, acting in the circumferential direction, and thus can be brought to a certain alignment in reference to the thread of the threaded spindle.

Figure 2:
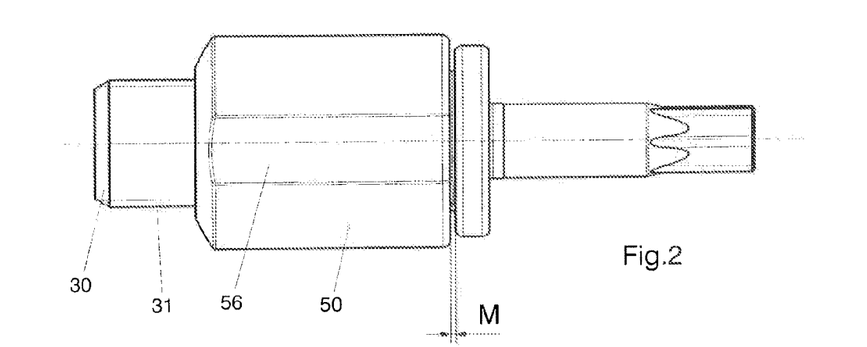
Figure 3:
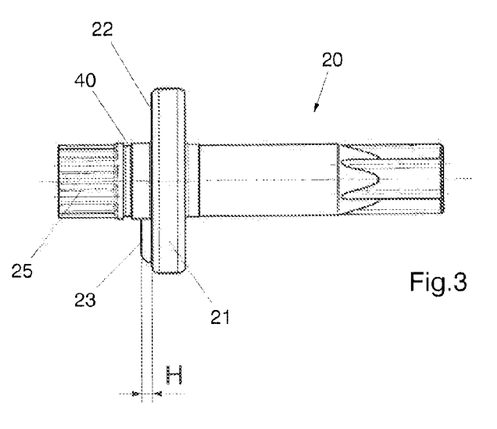

Although in FIGS. 2 and 3 the document U.S. Pat. No. 5,711,709 shows a threaded spindle with a drive part, which has a longitudinal axis, and shows a threaded part, which also has a longitudinal axis, and with a threaded nut in which the threaded part is guided, with the drive part and the threaded part being embodied as separate parts, here, which are connected to each other in an articulate fashion by way of plugging together, so that a radial mutual off-set or an inclination of the longitudinal axes of the drive part and the threaded part can be compensated, in spite thereof it cannot be excluded here that the ball drive jams during operation.

The primary problem in such ball drives is namely given such that in a faulty alignment of the two journals or in case of a distortion of the threaded spindle, thus a radial mutual off-set or incline of the longitudinal axes of the drive part and the threaded part, the ball drive may jam during operation and thus may be hindered from fulfilling its intended purpose, they are subject to considerably higher wear and tear, and may show a worsened effectiveness.

SUMMARY

The objective of the invention is to provide a threaded spindle of the type mentioned at the outset such that the disadvantages connected to a distortion of the threaded spindle can be avoided or at least strongly reduced.

This objective is attained according to the invention in a threaded spindle of the type mentioned at the outset such that the drive part and the threaded part are embodied as separate parts, each respectively provided with at least one coupling element, which are connected or can be connected to each other in an articulate fashion by way of plugging together such that a mutual off-set of the longitudinal axes of the drive part and the threaded part can be compensated.

The two-part embodiment of the threaded spindle according to the invention avoids or at least reduces the severity and the disadvantageous effects of shearing forces, which may occur during a distortion of a one-part threaded spindle, by creating the option of a joint between the drive part and the threaded part of the threaded spindle. Shearing forces, occurring in prior art when the threaded spindle is distorted and may lead to the threaded spindle and the threaded nut to jam, are excluded right from the start in the threaded spindle according to the invention because the drive part and the threaded part are both independently capable to compensate shearing forces and this way prevent any jamming. Simultaneously, by the embodiment of the threaded spindle according to the invention as a two-part spindle its wear and tear is reduced. Additionally, higher effectiveness is yielded in the drive train between the electric motor, the drive part, the threaded part, and the threaded nut because losses due to friction or the like in the threaded spindle according to the invention is considerably lower than in threaded spindles embodied in the technology of prior art described above.

Advantageous embodiments of the invention form the objectives of the dependent claims.

In an embodiment of the threaded spindle according to the invention said threaded spindle comprises at least one axially effective stop element, which cooperates in a contact position with at least one axially effective stop element of the drive part. In this embodiment the axially effective stop elements of the threaded nut and the drive part are embodied in a particular relationship to the start of the thread and to the pitch. This way, the two directions of rotation between the threaded nut and the drive part always exhibit a distance preventing the above-described jamming between the threaded nut and the threaded spindle, even when the longitudinal axes of the drive part and the threaded part might form an angle in reference to each other.

In another embodiment of the threaded spindle according to the invention the stop elements contact each other even in case of a radial off-set of the two longitudinal axes in the stop position and at least a slight distance is given between the face of the threaded nut and the stop boss of the drive part.

In another embodiment of the threaded spindle according to the invention the stop elements are arranged in at least one annular ring, with both diameters being greater than the external diameter of the thread of the threaded part and/or smaller than the external diameter of the threaded nut. This way the stop elements are held in a circumferential area in which they can fulfill their optimal effectiveness with regards to upholding an axial distance in order to avoid jamming.

In another embodiment of the threaded spindle according to the invention the stop element at the drive part or the threaded part represents a cam or the like. This yields a simple embodiment for an axially effective stop element.

In another embodiment of the threaded spindle according to the invention the thread of the threaded part exhibits a pitch which is greater than the height of the cam. This additionally serves to ensure that no jamming can occur.

In another embodiment of the threaded spindle according to the invention the cam projects from the face of the drive part and has radially a stop area and a corresponding stop recess is provided at the threaded nut or vice versa. When the threaded nut is turned back here the cam of the drive part is accepted by the stop recess of the threaded nut, or vice versa, in order to form a stop effective in the circumferential direction.

In another embodiment of the threaded spindle according to the invention, the cam is provided such that in the plugged-together state 360° prior to the stop position an assembly distance is given between the drive part and the threaded nut which is slightly greater than the pitch of the thread of the threaded nut. By this embodiment it is ensured in a simple fashion that a minimum distance remains between the drive part and the threaded nut even when the drive part is turned back.

In another embodiment of the threaded spindle according to the invention a grid for several plug-in positions is provided for plugging together the drive part and the threaded part. By selecting an appropriate plug-in position the axial distance can be chosen which ultimately remains when the drive part and the threaded nut are turned back.

In another embodiment of the threaded spindle according to the invention the thread is a ball screw or another low-friction thread. This yields the desired advantage that the threaded nut engages the threaded part in a very smooth-running fashion.

In another embodiment of the threaded spindle according to the invention the coupling elements are designed with little play. This way, the axial distance between the threaded nut and the drive part resulting at the end is better predictable.

In another embodiment of the threaded spindle according to the invention the coupling element of the drive part has a circlip for loss prevention. This way it can be prevented in a simple fashion that the drive part and the threaded part separate from each other unintentionally.

A safety system with a threaded spindle according to the invention or one of the above-described embodiments shows a simple, proven, and reliable structure.

One embodiment of the safety system represents a brake system for a vehicle. In this case the drive train, which comprises an electric motor, a drive part, a threaded part, and a threaded nut, leads to the otherwise hydraulically operated brake piston, forming the so-called parking brake.

Another embodiment of the safety system represents a steering system of a vehicle. The design of the drive train for operating the steering is equivalent to the above-mentioned drive train.

BRIEF DESCRIPTION OF THE DRAWINGS

In the following exemplary embodiments of the invention are described in greater detail with reference to the drawings. It shows.

DETAILED DESCRIPTION OF THE PREFERRED EMBODIMENTS

Figure 1:
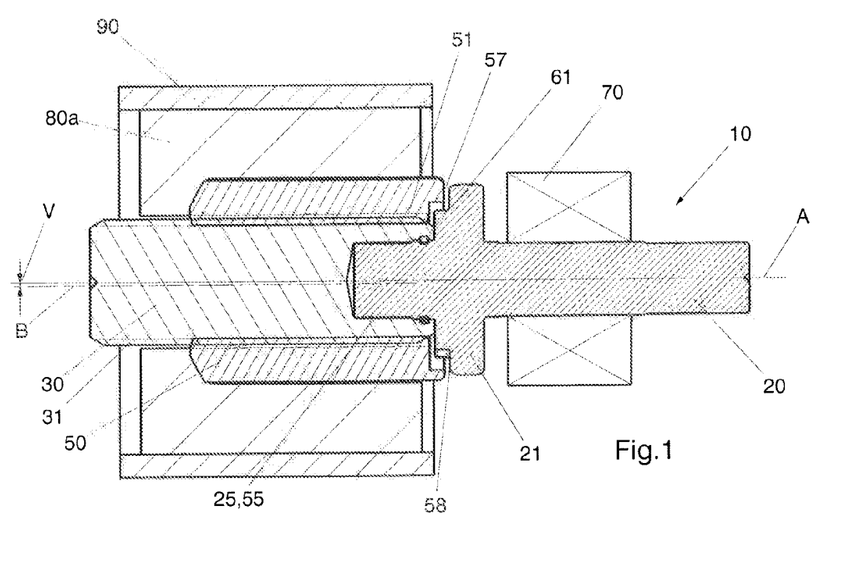
FIG. 1 in a longitudinal cross-section a first exemplary embodiment of a threaded spindle according to the invention, FIG. 2 a threaded spindle according to FIG. 1 in a longitudinal side view, FIG. 3 in a longitudinal side view a detail of the drive part of the threaded spindle according to FIGS. 1 and 2, FIG. 4 the drive part according to FIG. 3 in a view from the left in FIG. 3, FIG. 5 in a longitudinal side view another embodiment of the drive part of the threaded spindle according to FIGS. 1 and 2, FIG. 6 the drive part according to FIG. 5 in a view from the left in FIG. 5, FIG. 7 in a longitudinal side view the threaded part of the spindle nut according to FIGS. 1 and 2 in a partially opened state in order to disclose a coupling element, with in FIG. 7 the thread of the drive part only being indicated in a sketch, FIG. 8 a view of the threaded part according to FIG. 7 in a view from the right in FIG. 7, FIG. 9 in a longitudinal side view another embodiment of the drive part of the spindle nut according to FIGS. 1 and 2, which again is shown in a partially opened state in order to disclose a coupling element, with the thread of the threaded part being shown, here, FIG. 10 a view of the threaded part according to FIG. 9 in a view from the right in FIG. 9, FIG. 11 in a longitudinal cross-section a first embodiment of the threaded nut of the threaded spindle according to FIGS. 1 and 2, FIG. 12 a threaded nut according to FIG. 11 in a view from the right in FIG. 11, FIG. 13 in a longitudinal cross-section a second embodiment of the threaded nut of the threaded spindle according to FIGS. 1 and 2, FIG. 14 the threaded nut according to FIG. 13 in a view from the right in FIG. 13, FIG. 15 in a longitudinal side view a third embodiment of the threaded nut, FIG. 16 the threaded nut according to FIG. 15 in a view from the right in FIG. 15, FIG. 17 in a longitudinal cross-section a second embodiment of the threaded spindle according to the invention, which differs from the embodiment according to FIGS. 1 and 2 in the embodiment of the thread and a second journal, and FIG. 18 a threaded spindle according to FIG. 17 in a simplified longitudinal side view (without journal).
Figure 4:
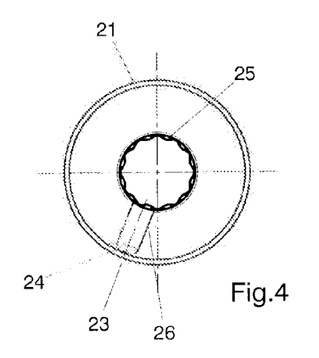
Figure 7:
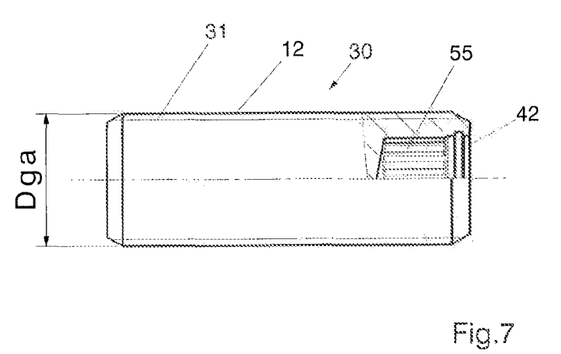
Figure 8:
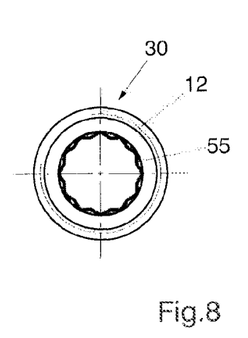
Figure 9:
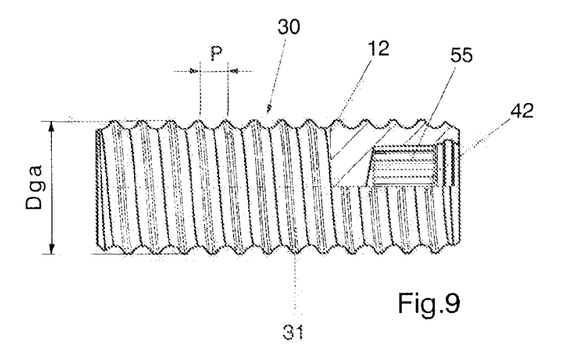
Figure 10:
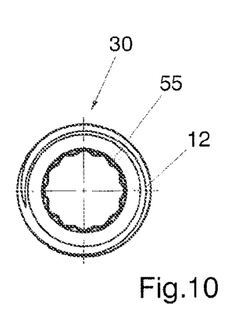

FIG. 1 shows in a longitudinal cross-section a first embodiment of a threaded spindle according to the invention, which is marked 10 in its entirety. The threaded spindle 10 comprises a drive part 20, which has a longitudinal axis A and is supported by a first journal 70, and a threaded part 30, which has a longitudinal axis B, as well as a threaded nut 50, which is supported by a second journal 80a and with the threaded part 30 being guided therein. The second journal can show at least two optional embodiments, with the first embodiment being shown in FIG. 1, marked 80a, and a second embodiment being shown in FIG. 17, marked 80b. According to the illustration in FIG. 1, the threaded part 30 and the threaded nut 50 each comprise a thread 31 and 51, respectively, which are mutually engaging. The thread 31 is an external thread, the thread 51 an internal thread. The drive part 20 and the threaded part 30 are embodied as separate parts, each respectively provided with one coupling element 25 (FIGS. 3 and 4) and/or 55 (FIGS. 7 and 9). The coupling elements 25, 55 can be connected in an articulate fashion by way of being plugged together so that a mutual radial off-set V develops (FIG. 1) or a mutual incline a (FIG. 17) of the longitudinal axes A, B of the drive part 20 and/or the threaded part 30 can be compensated. Shearing forces can be absorbed by the agility or joint motion possible by the drive part 20 and the threaded part 30 in the plugged-together state so that any mutual radial off-set V or inclination a can be compensated, which is described in greater detail in the following. If the drive part 20 and the threaded part 30 were arranged precisely aligned coaxially their mutual radial off-set V would be zero. The same applied for the inclination a, if the drive part 20 and the threaded part 30 were arranged precisely collinearly.

Figure 5:
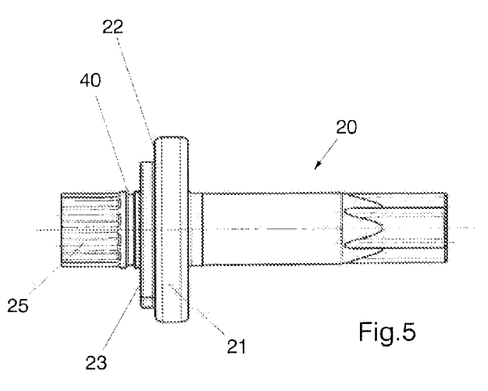

The coupling elements 25, 55 are each embodied similar to keyway gears. In the plugged-together state of the drive part 20 and the threaded part 30 both gears comb each other. In order for the drive part 20 and the threaded part to engage each other a grid is provided for several plugging positions. The drive part 20 and the threaded part 30 can also be plugged together in different, radially off-set positions. The coupling elements 25, 55 are designed with little mutual play. The coupling element 25 of the drive part 20 comprises a circlip 61 for loss prevention. The drive part 20 has a groove 40 (FIGS. 3 and 5) to accept the circlip 61. A corresponding groove 42 (FIGS. 7 and 9) comprises a threaded part 30. The assembly of the circlip 61 occurs here as follows: The circlip 61 is inserted into the groove 40 of the drive part 20. The groove 40 has approximately the depth of the radial thickness of the circlip 61. However, the circlip 61 inserted in the groove 40 projects in the relaxed state from the groove 40. During the insertion of the drive part 20 into the threaded part 30 the circlip 61 in the groove 40 of the drive part 20 is compressed. Subsequently the circlip 61 expands again and additionally snaps into the groove 42 of the threaded part 30. Now the circlip 61, which once more shows its original diameter, is installed in both grooves 40, 42 and thus ensures loss prevention.

The journal 70 is commonly embodied as a roller bearing. This roller bearing could be embodied as a radial and an axial roller bearing. However, an axial journal may be inserted between the journal 70 and the stop boss 21 of the drive part 20, which compensates axial forces and is axially supported on the journal 70 or a housing part carrying said journal 70. The journal 80a at the threaded nut 50 is embodied as a guide bearing or friction bearing. The threaded nut 50 can perform a displacing motion only in the axial direction. At least one area 56 (FIG. 2) formed at the threaded nut 50, which cooperates with a complementary area at the journal 80a, hinders the threaded nut 50 from any rotation.

The second journal 80a or 80b represents the guide for the threaded nut 50. In the first embodiment of the second journal 80a, shown in FIG. 1, the journal is embodied as a socket, which extends in FIG. 1 at the left face over the adjacent face of the threaded nut 50. The journal 80a in turn is supported in a displaceable fashion in a guide part 90, which is embodied stationary. When the threaded spindle 10 is used in a vehicle brake, as shown in the document WO 99/45292 A1 mentioned at the outset, the threaded nut 50 would form, together with the journal 80a, an actuator of the brake. In the threaded spindle 11 according to FIG. 17 the threaded nut 50 would form the actuator alone, because the second journal 80b is embodied in a stationary fashion.

The stop boss 21 of the drive part 20 cooperates with an adjacent face 58 of the threaded nut 50 in a manner described in greater detail in the following.

When the drive part 20 is set in motion in one direction by an electric motor (not shown) or the like, the threaded nut 50 is moved towards the left in FIG. 1 via the coupling elements 25, 55 engaged according to the illustration in FIG. 1 until a part operated by the journal 80a, e.g., the brake piston of a vehicle brake, has reached a desired position, in which the brake is activated. This desired position is not shown in FIG. 1. When the electric motor or the like is operated in the opposite direction the threaded nut 50 is moved back together with the journal 80a on the threaded part 30 into the position shown in FIG. 1. It is critical here that during the return motion between the drive part 20 and the threaded nut 50, jamming can occur when the faces 57, 58 mutually contact, so that the position generated by operating the threaded part 30 via the drive part 20, in which the faces 57, 58 contact each other, cannot be easily released.

In order to address this problem the threaded nut 50 comprises a stop element 53 at its face 57 in FIG. 1 at the right side. There are different optional embodiments for the stop element 53, with three of them being shown in FIGS. 12 and 14-16, which are discussed in greater detail in the following. In the stop position the stop element 53 cooperates with a stop element 23 of the drive part 20 acting in the circumferential direction. There are several options for its embodiment, with two of them being shown in FIGS. 4-6, which are explained in greater detail in the following.

It is important that even in case of a radial off-set V of the longitudinal axes A and B of the drive part and the threaded part the stop elements 24, 53 contact each other and at least a slight distance is given between the faces 57 of the threaded nut 50 and the face 58 of the stop boss 21 of the drive part 20.

Figure 6:
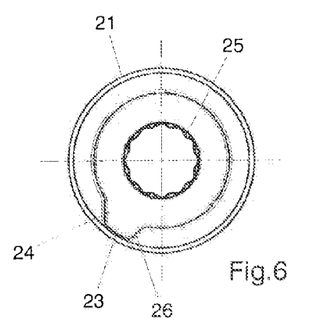
Figure 11:
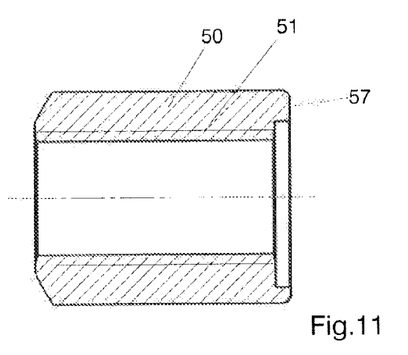
Figure 12:
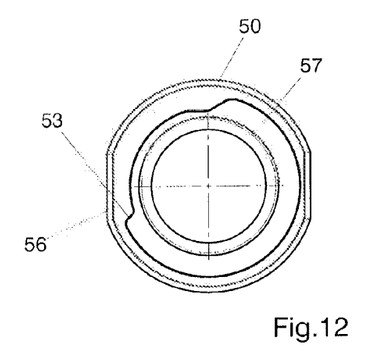
Figure 13:
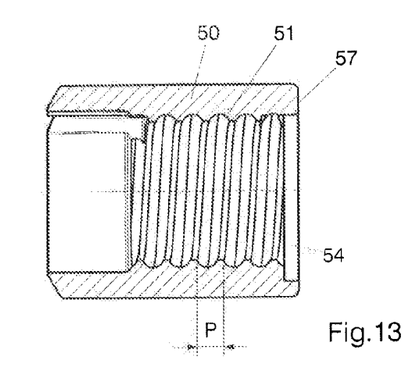
Figure 14:
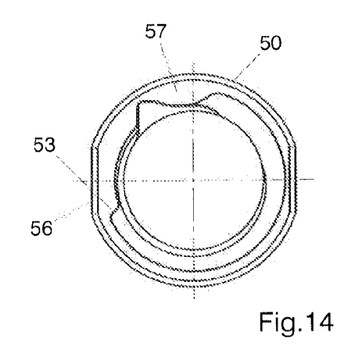
Figure 15:
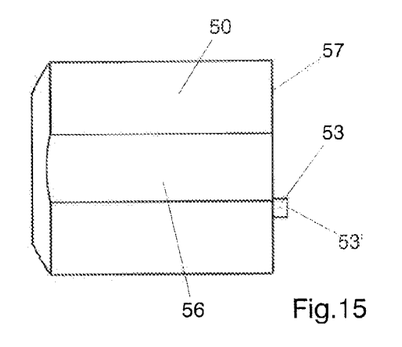
Figure 16:
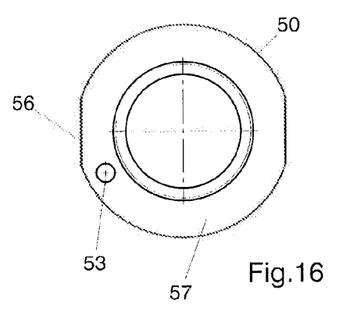

The stop elements 23, 53 are arranged in an annular ring, with both of its diameters being greater than an external thread diameter $D_{ga}$ of the threaded part 30 (FIG. 18) and/or smaller than an external diameter $D_{ma}$ of the threaded nut 50. The stop element 23 or 53 at the drive part 20 and/or at the threaded nut 50 is a cam 24 or 53'. The cam 24 has a height H. The thread 12 of the threaded part 30 shows, a pitch P like the thread 51 of the threaded nut 50, which is greater than the height H of the cam 24. The cam 24 projects from a facial area of the drive part 20 and exhibits radially a stop area 26 (FIG. 6). A corresponding stop recess 54 is provided at the threaded nut 50 (FIGS. 11 and 13). The arrangement may also be vice versa, meaning the stop area and the cam can be mutually exchanged. The cam 24 is fastened such that in the inserted state between the drive part 20 and the threaded part 30, 360° prior to the stop position, an assembly distance M (FIG. 2) is given between the drive part 20 and the threaded nut 50, which is slightly greater than the pitch P of the thread 12 of the threaded part 30 or the thread 51 of the threaded nut 50 (FIGS. 9 and/or 13). By the assembly with the circlip 61 the position of the stop element 23 or 53 is defined in reference to the pitch P.

When the threaded nut 50 has been returned to the stop position shown in FIG. 1 the threaded nut 50 and the drive part 20 may be mutually jammed, because their faces 57 and 58 tightly contact each other. The friction between the two faces 57, 58 may become so severe that the electric motor cannot release them from each other. Accordingly a projection is provided between the two faces 57, 58, such as the above-mentioned cam 24, which ensures a certain minimum distance in this position and this way prevents any jamming between the threaded spindle 10 and the threaded nut 50.

The stop recess 54 is allocated to the cam 24, formed in the face 57 of the threaded nut 50. When the drive part 20 is turned back the cam 24 contacts a lateral area of the stop recess 54 before the face 57 contacts the face 58 of the stop boss 21. This way a stop is formed in the circumferential direction, which prevents any jamming between the threaded nut 50 and the threaded spindle 10. The stop boss 21 is formed at the drive part 20, as discernible from FIG. 1.

Figure 17:
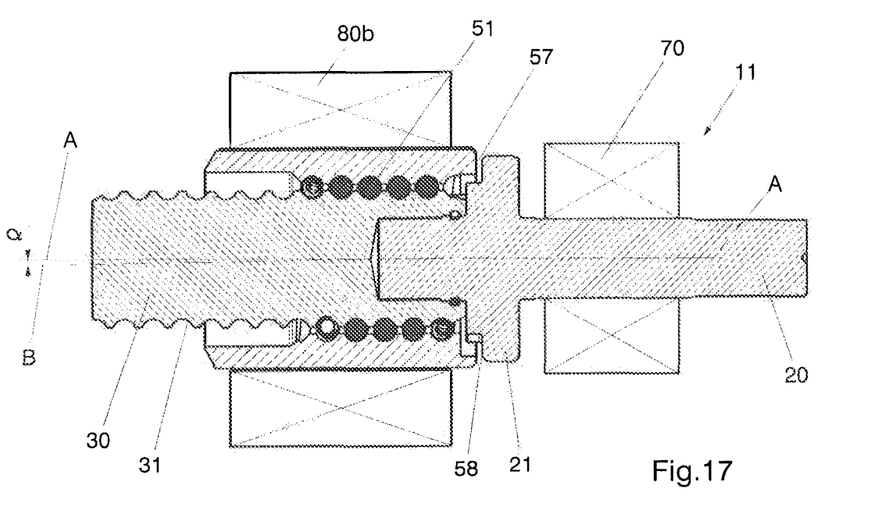
Figure 18:
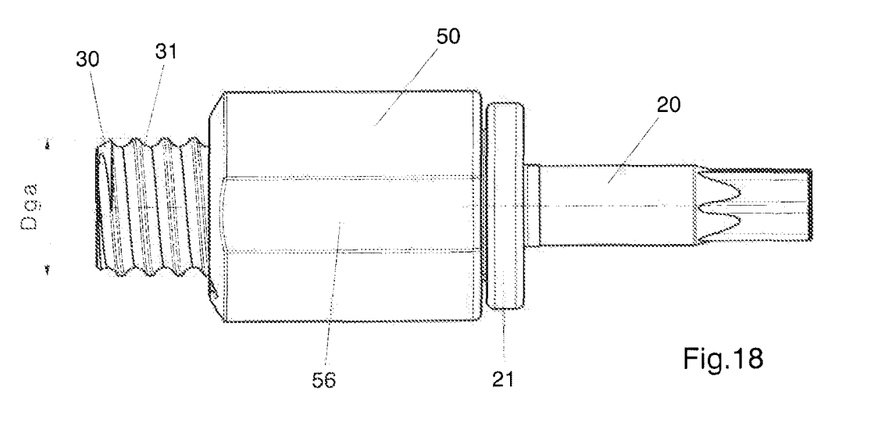

The second embodiment of the threaded spindle according to the invention shown in FIGS. 17 and 18 and marked 11 in its entirety differs from the first embodiment according to FIGS. 1 and 2 primarily in that the internal thread 51 of the threaded nut 50 and the external thread 31 of the threaded part 30 are each embodied as ball screws and that the second journal 80b is embodied in a stationary fashion. The function and the structure of the ball screw is conventional and thus requires no description in greater detail.

The division of the threaded spindle 10 into a drive part 20 and a threaded part 30 yields the following advantages, once more summarized here:

Higher efficiency

Longer life, due to less wear and tear

Compensation of shearing forces due to the optional motion between the drive part 20 and the threaded part 30

Reduction of shearing forces due to the joint function

Lower production costs

Longer life

Higher resilience

LIST OF REFERENCE CHARACTERS

10 Threaded spindle (1st embodiment)
11 Threaded spindle (2nd embodiment)
12 Thread
20 Drive part
21 Stop boss
23 Stop element
24 Cam
25 Coupling element
26 Stop area
30 Threaded part
31 External thread
40 Groove
42 Groove
50 Threaded nut
51 Thread of the threaded nut
53 Stop element
53' Cam
54 Stop recess
55 Coupling element
56 Area
57 Face
58 Face
61 Circlip
70 First journal
80a Second journal (1st embodiment)
80b Second journal (2nd embodiment)
90 Guide part
A Longitudinal axis
B Longitudinal axis
H Height of cam
M Distance when assembled
P Pitch
α Inclination
$D_{ma}$ External diameter of the threaded nut
$D_{ga}$ External diameter of the threaded part
V Radial off-set

The invention claimed is:

1. A threaded spindle (10) comprising a drive part (20), which has a longitudinal axis (A) and is mounted in a first journal (70), a threaded part (30), which has a longitudinal axis (B), a threaded nut (50), which is mounted in a second journal (80a; 80b) and in which the threaded part (30) is guided, the drive part (20) and the threaded part (30) are embodied as separate parts, each of which provided with at least one coupling element (25, 55), which are connected or are connectable to each other in an articulate fashion by a plug-in connection so that a mutual radial offset (V) or inclination (a) of the longitudinal axes (A, B) of the drive part (20) and the threaded part (30) is compensatable by allowing a relative motion of the drive part (20) and the threaded part (30) during operation of the spindle (10) and wherein the threaded nut (50) comprises at least one stop element (53) acting in a circumferential direction, which cooperates in a stop position with at least one stop element (23) of the drive part (20) acting in the circumferential direction.

2. A threaded spindle (10) according to claim 1, wherein for a radial offset (V) of the longitudinal axes (A, B) in the stop position, the stop elements (23, 53) contact each other and at least a slight distance exists between a face (57) of the threaded nut (50) and a stop boss (21) of the drive part (20).

3. A threaded spindle (10) according to claim 1, wherein the stop elements (23, 53) are arranged in at least one annular ring that has two diameters that are at least one of greater than an exterior thread diameter ($D_{ga}$) of the threaded part (30) or smaller than an exterior diameter ($D_{ma}$) of the threaded nut (50).

4. A threaded spindle (10) according to claim 1, wherein the at least one stop element (23 or 53) at the drive part (20) or the threaded part (30) comprises a cam (24).

5. A threaded spindle (10) according to claim 4, wherein a thread (31) of the threaded part (30) has a pitch (P) which is greater than a height (H) of the cam (24).

6. A threaded spindle (10) according to claim 5, wherein the cam (24) projects from a face (58) of the drive part (20) and has a stop area (26) that extends radially and at the threaded nut (50) a corresponding stop recess (54) is arranged.

7. A threaded spindle (10) according to claim 5, wherein the cam (24) is arranged such that in a plugged-in state 360° prior to the stop position an assembly distance (M) is given between the drive part (20) and the threaded part (30), which is slightly greater than the pitch (P) of the thread (52) of the threaded nut (50).

8. A threaded spindle (10) according to claim 1, wherein a grid is provided for several insert position for plugging together the drive part (20) and the threaded part (30).

9. A threaded spindle (10) according to claim 1, wherein the thread (31, 52) is a ball screw or a low-friction thread.

10. A threaded spindle (10) according to claim 1, wherein the coupling elements (25, 55) are designed with little play.

11. A threaded spindle (10) according to claim 1, wherein the coupling element (25) of the drive part (20) comprises a circlip (61) for loss prevention (60).

12. A safety system with a threaded spindle (10) according to claim 1.

13. A safety system according to claim 12, wherein the safety system is a braking system for a vehicle.

14. A safety system according to claim 12, wherein the safety system is a steering system for a vehicle.

* * * * *